US 7,727,674 B2

(12) United States Patent
Yanagida et al.

(10) Patent No.: US 7,727,674 B2
(45) Date of Patent: Jun. 1, 2010

(54) NONAQUEOUS SECONDARY BATTERY

(75) Inventors: Toshio Yanagida, Itano-gun (JP);
Yoshinobu Okumura, Sumoto (JP);
Yasuhiro Yamauchi, Sumoto (JP);
Naoya Nakanishi, Tokushima (JP);
Toshiyuki Nohma, Kobe (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 645 days.

(21) Appl. No.: 11/509,845

(22) Filed: Aug. 25, 2006

(65) Prior Publication Data

US 2007/0048613 A1   Mar. 1, 2007

(30) Foreign Application Priority Data

Aug. 30, 2005   (JP) .............................. 2005-249239
Mar. 31, 2006   (JP) .............................. 2006-097950

(51) Int. Cl.
*H01M 4/66* (2006.01)

(52) U.S. Cl. ...................... 429/245; 429/233; 429/232; 429/247; 429/231.1; 429/231.8; 429/231.3; 429/218.1; 429/231.95; 429/94

(58) Field of Classification Search ................ 429/245, 429/233, 247, 231.1, 231.3, 231.8, 218.1, 429/231.95, 94, 232
See application file for complete search history.

(56) References Cited

U.S. PATENT DOCUMENTS

| 6,387,562 | B1 * | 5/2002 | Akahira ......................... 429/94 |
| 6,485,866 | B1 * | 11/2002 | Gauthier et al. ............. 429/245 |
| 6,933,077 | B2 * | 8/2005 | Sudano et al. ............... 429/234 |
| 7,223,502 | B2 * | 5/2007 | Onuki ........................ 429/326 |
| 7,335,448 | B2 * | 2/2008 | Kaito et al. ............. 429/231.95 |
| 2003/0224242 | A1 | 12/2003 | Kaito et al. |
| 2004/0202928 | A1 | 10/2004 | Miyamoto et al. |
| 2004/0219433 | A1 * | 11/2004 | Besner et al. ................ 429/233 |

FOREIGN PATENT DOCUMENTS

| JP | 10-241737 A | 9/1998 |
| JP | 2000-030742 A | 1/2000 |
| JP | 2001-93583 A | 4/2001 |
| JP | 2002-42881 A | 2/2002 |

* cited by examiner

*Primary Examiner*—Laura S Weiner
(74) *Attorney, Agent, or Firm*—Westerman, Hattori, Daniels & Adrian, LLP

(57) ABSTRACT

A nonaqueous secondary battery 10 of the invention has an active material compound layer 14 deposed over at least one face of a collector 12 made of metal foil and is equipped with a positive electrode 11 having a portion 13 in a part of which metal is exposed. The positive electrode 11 together with the exposed-metal portion 13 faces a negative electrode 17 through an interposed separator 23, and on that part of the exposed-metal portion 13 that faces the negative electrode 17 through the interposed separator 23 there is formed a protective layer 16 made of a material whose electronic conductivity is lower than that of the metal and which moreover is non-insulative. With such nonaqueous secondary battery 10, should part of an electrode pierce the separator and contact with the other electrode, the battery will be gently discharged, thereby averting abnormal heat generation by the battery and additionally enabling the battery's abnormality to be sensed by the equipment via the fall in battery voltage. Thus, there is provided a nonaqueous secondary battery of excellent safety that can prevent abnormal heat generation due to a short circuit caused by burr, powder or the like piercing the separator.

13 Claims, 13 Drawing Sheets

NONAQUEOUS SECONDARY BATTERY

FIELD OF THE INVENTION

The present invention relates to a nonaqueous secondary battery. More particularly it relates to a nonaqueous secondary battery of excellent safety in which abnormal heat generation due to short circuits occurring when burr, powder or the like pierces the separator can be prevented.

RELATED ART

With the rapid spread of mobile electronic equipment, electric vehicles (EVs), hybrid electric vehicles (HEVs) and the like, the specifications required the batteries used in such items have become more stringent with every year. In particular, such batteries are required to be compact and lightweight and to have high capacity and output, as well as to excel in cycling characteristics and give stable performance. Accordingly nonaqueous secondary batteries, which have high energy density compared to other batteries and of which are typified by the lithium ion battery, are receiving much attention in the field of secondary batteries. The lithium nonaqueous secondary battery is gaining an increasingly large share of the secondary battery market.

A lithium nonaqueous secondary battery may, for example, be equipped with a rolled electrode array, in which case it will have a structure such that between negative electrodes composed of a negative electrode core (collector) made of copper foil or similar in elongated sheet form that is coated with negative electrode active material compound on both sides, and positive electrodes composed of a positive electrode core made of aluminum foil or similar in elongated sheet form that is coated with positive electrode active material compound on both sides, there are deployed separators constituted of a film of microporous polyethylene or polypropylene, or stacked films thereof; the positive and negative electrodes, insulated from each other by the separators, are rolled into a cylindrical or elliptical form; in the case of a rectangular battery the rolled electrode bodies are additionally crushed into a flattened shape; and negative electrode tabs and positive electrode tabs are connected to certain portions of, respectively, the negative electrodes and the positive electrodes, the resulting assembly being housed inside a case of a particular shape.

Alternatively a lithium nonaqueous secondary battery may be equipped with a stacked electrode array, in which case it will have a structure such that between negative electrodes composed of a negative electrode core made of copper foil or similar in elongated sheet form that is coated with negative electrode active material compound on one side or both sides, and positive electrodes composed of a positive electrode core made of aluminum foil or similar in elongated sheet form that is coated with positive electrode active material compound on both sides, there are deployed separators constituted of a film of microporous polyethylene or polypropylene, or stacked films thereof; the positive electrodes and negative electrodes, insulated from each other by the separator, are stacked in multiple layers to form a stacked electrode array, the negative electrode tabs formed on a certain portion of each negative electrode are connected to one another in parallel, and likewise the positive electrode tabs formed on a certain portion of each positive electrode are connected to one another in parallel, the resulting assembly being housed inside a case of a particular shape.

But in nonaqueous secondary batteries, typified by the lithium ion battery, the negative electrode compound layer must extend further than, and face, through the interposed separator, the positive electrode's compound-coated portion, in order to have the negative electrode active material smoothly absorb the lithium ions that are released by the positive electrode active material during charging. This means that not a few nonaqueous secondary batteries are so structured that the positive electrode's non active material-coated portion, that is, the portion where a part of the collector composed of metal foil is exposed, faces the negative electrode through the interposed separator.

With such a structure, in which a exposed part of the collector, composed of metal foil, of each electrode of one polarity faces an electrode of the other through an interposed separator, a large current that could cause heat generation will flow should powder that separates from the electrode or a part thereof due to dropping or vibration, etc., of the device penetrate through the separator and cause a short circuit. Further, the above-mentioned rolled electrode array or stacked electrode array is manufactured by cutting out given negative electrodes and positive electrodes from negative electrode material and positive electrode material, and during such process burr may be generated at the cut end portions of the negative and positive electrodes, that is, at the cut end portions of the collectors made of metal foil; an adjacent separator may be pierced by such burr, with the result that the negative and positive electrodes become electrically continuous via such burr and a short circuit is formed. If this happens, the short circuit will result in the battery generating abnormal heat when used, which will lead to a fall in capacity and also shorten the battery's life.

For this reason, Japanese Laid-Open Patent Application Publication No. 1998-241737 and Japanese Laid-Open Patent Publication No. 2002-042881, for example, disclose nonaqueous secondary batteries in which, out of the positive electrodes, the separators and the negative electrodes, insulating tape is applied to at least the negative electrodes, and, in that case, to at least the portion of the negative electrodes that face the positive electrode lead. More specifically, during manufacturing of the electrode roll, which is formed by laying the positive electrodes and negative electrodes over one other with separators interposed therebetween, the negative electrodes are positioned, specific insulating tape of a thickness greater than the height of any burr that is generated on the positive and/or negative electrodes during formation of the electrode roll and could cause a short circuit with the positive electrode is stuck to at least one face of the positioned negative electrodes at the position where short-circuiting with a positive electrode is anticipated.

Also, in Japanese Laid-Open Patent Publication No. 2001-093583 there is disclosed a nonaqueous secondary battery in which an insulating layer made of insulative resin is formed on, for example, both faces of the base part of the protruding portions, where metal is exposed, of both the positive and the negative electrodes of the electrode roll, so that even if the non-protruding end portion of positive or negative electrodes become exposed due to roll deviation in the axial direction of the separators, the presence of the insulating layer will prevent short circuiting between the base parts of the protruding portions of the positive and negative electrodes, and moreover short circuiting due to burr generated by punching of the electrode plates, etc., is also prevented.

An example of a nonaqueous secondary battery having a rolled electrode array as disclosed in Japanese Laid-Open Patent Publication No. 2001-093583 will now be described with reference to FIGS. 12 and 13. FIG. 12 is a cross-sectional perspective view of the whole of a nonaqueous secondary battery having a rolled electrode array as disclosed in Japanese Laid-Open Patent Publication No. 2001-093583, while FIG. 13 is a cross-sectional schematic view illustrating in outline the rolled electrode array in FIG. 12.

This nonaqueous secondary battery 50 having a rolled electrode array comprises: a core bar 53 that has at its ends a positive electrode terminal 51 and a negative electrode terminal 52; a rolled electrode body 57 composed of electrode sets each composed of a positive electrode plate 54, a negative electrode plate 55 and two separators 56; and a case 58, as shown in FIG. 12. The core bar 53 is the axis of the electrode roll 57, and at its ends in the axial direction has a pair of electrode terminals, namely the positive electrode terminal 51 and the negative electrode terminal 52, which are positioned with their backs to each other, protrude from the case 58, and supply electric power to the exterior. Thus the core bar 53 comprises the positive electrode terminal 51, the negative electrode terminal 52, and therebetween an insulative coupling pin 59 that insulates and couples the positive electrode terminal 51 and the negative electrode terminal 52. The coupling pin 59 couples the two electrode terminals 51 and 52 by fitting therebetween.

The electrode roll 57 is composed of electrode sets each comprising a strip-form positive electrode plate 54, a negative electrode plate 55, and a pair of strip-form separators 56 that are placed between the electrode plates 54, 55 and rolled together with them between the two electrode terminals 51, 52. Each positive electrode plate 54 is composed of a collecting plate 61 that is made of strip-form aluminum foil and forms a protruding portion 60, and a positive electrode active material layer 62 of lithium manganese oxide or the like that is applied over a rectangular area on both faces of the collecting plate 61. Likewise each negative electrode plate 55 is composed of a collecting plate 64 that is made of strip-form copper foil and forms a protruding portion 63, and a negative electrode active material layer 65 of carbon or the like that is applied over a rectangular area on both faces of the collecting plate 64.

The protruding portion 60 of the positive electrode plate 54 and the protruding portion 63 of the positive electrode plate 55 are formed so that each protrudes at the opposite end to the other in the roll axis direction. Neither protruding portion 60 nor protruding portion 63 has active material 62, 65 applied thereto, and the metal foil portions of the collecting plates 61, 64 are exposed. That is, active material 62, 65 is applied only to those rectangular areas of the positive electrode plate 54's and negative electrode plate 55's collecting plates 61 and 64 that are separated by the separators 56. The protruding portions 60 and 63 each have at their base portion, on the inner and outer face respectively, an insulating layer 66 or 67 that is formed with a particular width and is for preventing short circuits. The insulating layers 66 and 67 are formed by applying a thin coating of polyethylene, a resin that is non-soluble in the electrolyte, via the hot melt method.

Thus as FIG. 13 shows, a separator plate 56 is lodged between the protruding portion 60, 63 of each positive/negative electrode plate 54, 55 and the non-protruding portion 68, 69 of the adjacent opposite-polarity electrode, so that the protruding portions 60, 63 of each electrode of one polarity are insulated from the non-protruding portions 68, 69 of the electrodes of the opposite polarity by the separator 56; but not only that, they are also insulated by the insulating layers 66, 67 as well. This means that should a roll deviation occur during the rolling process, with the result that a separator 56 is displaced from between the protruding portion 60 or 63 of an electrode of one polarity and the non-protruding portion 68 or 69 of an electrode of the other, the presence of the insulating layers 66, 67 will prevent short circuiting between the electrode plates 54, 55, and will also prevent short circuiting between the electrode plates 54, 55 due to burr that may be produced at the side edges of the positive electrode plate by punching.

With the related art as described in the above example, the problem of burr generated during fabrication of the positive and negative electrodes can be amply addressed. However, since the use of the insulating layers as short-circuit prevention layers makes charging/discharging possible—as long as no short circuit occurs—even with the separator in a pierced state such as described above, there is the problem that if the battery continues to be used in such a state over a prolonged period, the damaged portion will develop into rupturing of the separator, which will cause a large short circuit that will result in the battery generating abnormal heat.

The present inventors conducted a series of many and varied experiments into structures that could assure the safety of a nonaqueous secondary battery, by ensuring that, despite its being in a state such as described above, where burr or powder that has separated from the electrodes has pierced a separator, nevertheless no short circuiting will occur. As a result they found out that if, in such a state, a gentle discharge can be brought about, rather than maintaining insulation, then it will be possible for abnormality in the battery to be sensed by the equipment via the fall in battery voltage, and at the same time abnormal heat generation will be averted; moreover, the battery will ultimately discharge completely, thereby assuring the safety of the nonaqueous secondary battery. Subsequently they discovered that a structure able in this way to bring about a gentle discharge in a state where, despite burr or powder separated from the electrodes having pierced a separator, no short circuiting has occurred, can be achieved by employing as a protective layer a material that is non-insulative despite having lower electronic conductivity than the collector, instead of the insulating layer serving as short-circuit preventing layer, in the above-described example of a related art nonaqueous secondary battery.

On the other hand, in nonaqueous secondary batteries for use with EVs and HEVs, the active material compound coatings are made thin by applying small amounts per unit area, and use is made of an electrode array of multiple stacked layers, or of elongated electrodes rolled in numerous layers, in order to ensure that the large-current load characteristics are satisfactory. To detect stacking deviations or rolling deviations in such electrode array automatically, use has long been made of radiolucent imaging, but even so, detection of such deviations is problematic because of the small amount of X-rays that penetrate. Furthermore, detection of stacking deviations or rolling deviations in an electrode array in which a protective layer is formed as described above would be even more of a problem in terms of identification, as it would be necessary to detect each of the boundaries among three items: the active material compound layer, the protective layer and the collector.

SUMMARY OF THE INVENTION

So that forming the aforementioned protective layer could not only assure the safety of the nonaqueous secondary battery, but also permit detection of each of the boundaries among the trio of active material compound layer, protective layer and collector, thereby enabling detection of stacking deviations or rolling deviations in such electrode array, the inventors pursued a further series of investigations into the compositional materials for the protective layer, and into detection means. As a result, they discovered that when the particle size (specific surface area) of the carbon material serving as the conductive material added to the protective layer is changed, it becomes easily possible, by implementing image processing using optical sensors, to detect each of the boundaries among the trio of active material compound layer, protective layer and collector.

Thus, the object of the present invention is to provide a nonaqueous secondary battery of excellent safety such that: if burr, powder or the like pierces the separator, a gentle discharge is brought about which prevents short circuiting and the resulting abnormal heat generation; abnormality in the battery can be detected by the equipment in which it is used; and moreover, the battery can ultimately be completely discharged, and the equipment in which it is used prevented from operating thereafter.

Another object of the present invention is to provide a nonaqueous secondary battery of outstanding productivity and safety such that: if burr or the like pierces the separator, a calm discharge is brought about which prevents short circuiting and the resulting abnormal heat generation; abnormality in the battery can be detected by the equipment in which it is used; the battery can ultimately be completely discharged and the equipment in which it is used prevented from operating thereafter, and furthermore, stacking deviations or rolling deviations in the electrode array during manufacture can be automatically detected.

In order to achieve the above objectives, a nonaqueous secondary battery according to the present invention has:

an active material compound layer placed on at least one face of a collector made of metal foil;

an electrode of one polarity that has a portion with a part where the metal of said collector made of metal foil is exposed; and an electrode of the opposite polarity, which faces the portion with exposed metal of said electrode of one polarity through an interposed separator;

and has the feature that a protective layer made of material whose electronic conductivity is lower than that of the metal and which moreover is non-insulative is formed on that part of the portion with exposed metal that faces the opposite-polarity electrode through the interposed separator.

It is essential to the present invention that the protective layer should be of a material which has lower electronic conductivity than that of the metal and which moreover is non-insulative. If the protective layer's electronic conductivity is the same as or better than that of the metal, there will flow a large current substantially similar to that in the case where a direct short circuit occurs between the electrode of the one polarity and the electrode of the other, and as a result the battery will generate abnormal heat and the desired effects will not be exerted.

Also, with the present invention it is possible to use a carbonate, lactone, ether, ester or the like as the nonaqueous solvent (organic solvent) constituting the nonaqueous solvent system electrolyte, or to use two or more of such solvents mixed together. Of such solvents, a carbonate, lactone, ether, ketone, ester or the like will preferably be used; more preferably, a carbonate will be used.

The following may be cited as concrete instances of the aforementioned solvents: ethylene carbonate (EC), propylene carbonate (PC), butylene carbonate (BC), vinylene carbonate (VC), cyclopentanone, sulfolane, 3-methylsulfolane, 2,4-dimethylsulfolane, 3-methyl-1,3-oxizolidine-2-one, dimethyl carbonate (DMC), methylethyl carbonate (MEC), diethyl carbonate (DEC), methylpropyl carbonate, methylbutyl carbonate, ethylpropyl carbonate, ethylbutyl carbonate, dipropyl carbonate, γ-butyrolactone, γ-valerolactone, 1,2-dimethoxyethane, tetrahydrofuran, 2-methyl tetrahydrofuran, 1,3-dioxyolane, methyl acetate, ethyl acetate, 1,4-dioxane, etc.

Likewise the following lithium salts may be cited as instances of the electrolyte: lithium perchlorate ($LiClO_4$), lithium hexafluorophosphate ($LiPF_6$), lithium borofluoride ($LiBF_4$), lithium hexafluoroarsenate ($LiAsF_6$), lithium trifluoromethyl sulfonate ($LiCF_3SO_3$), lithium bis (trifluoromethyl sulfonyl)imide [$LiN(CF_3SO_2)_2$], etc. Of these, it will be preferable to use $LiPF_6$ or $LiBF_4$, preferably dissolved in the nonaqueous solvent in a ratio of 0.5 to 2.0 moles per liter.

An embodiment of the present invention is the nonaqueous secondary battery with the further feature that the electrode of one polarity is a positive electrode and the collector made of metal foil is composed of aluminum or an alloy with aluminum as primary constituent.

An embodiment of the present invention is the nonaqueous secondary battery, with the further feature that the active material compound layers contain metal oxide.

For the metal oxide, lithium transition-metal compound oxide, which is capable of reversibly absorbing/releasing lithium ions and is expressed as $Li_xMO_2$ (where M is at least one of Co, Ni, and Mn), for example, $LiCoO_2$, $LiNiO_2$, $LiN_{i_y}Co_{1-y}O_2$ (y=0.01 to 0.99), $Li_{0.5}MnO_2$, $LiMnO_2$, $LiCo_xM_{n_y}Ni_zO_2$ (x+y+z=1), etc., will be used, either singly or as a mixture of multiple such.

An embodiment of the present invention is the nonaqueous secondary battery with the further feature that the electrode of the opposite polarity has an active material compound layer whose primary constituent is carbon. For the active material whose primary constituent is carbon, use can be made of natural graphite, synthetic graphite, carbon black, coke, glassy carbon, carbon fiber, or a calcined version of any of these or a mixture of multiple such.

An embodiment of the present invention is the nonaqueous secondary battery with the further feature that the active material compound layer whose primary constituent is carbon is applied to at least one face of the collector made of metal foil.

An embodiment of the present invention is the nonaqueous secondary battery with the further feature that the opposite-polarity electrode's collector made of metal foil is composed of copper or an alloy with copper as primary constituent.

An embodiment of the present invention is the nonaqueous secondary battery with the further feature that the opposite-polarity electrode's collector made of metal foil is composed of nickel or an alloy with nickel as primary constituent.

An embodiment of the present invention is the nonaqueous secondary battery with the further feature that the opposite-polarity electrode's collector made of metal foil is composed of stainless steel.

An embodiment of the present invention is the nonaqueous secondary battery with the further feature that the electrode of one polarity is a positive electrode and the electrode of the opposite polarity is a negative electrode, a rolled electrode array is formed by rolling the positive electrode and negative electrode with a separator interposed therebetween, and a portion where metal is exposed is formed on at least one of the roll-direction edges of the positive electrode.

An embodiment of the present invention is the nonaqueous secondary battery with the further feature that the electrode of one polarity is a positive electrode and the electrode of the opposite polarity is a negative electrode, a stacked electrode array is formed by stacking the positive electrode and negative electrode with a separator interposed therebetween, and a portion where metal is exposed is formed at the edges of the positive electrode.

An embodiment of the present invention is the nonaqueous secondary battery with the further feature that the protective layer consists of an insulative high-molecular substance and powder of at least one item selected from a group consisting of, electronically conductive carbon, a semiconductor material, and an electrically conductive oxide, which has been dispersed in the insulative high-molecular substance.

An embodiment of the present invention is the nonaqueous secondary battery with the further feature that the insulative high-molecular substance is at least one item selected from a group consisting of polyimide, polyamidoimide, and polyvinylidene fluoride.

An embodiment of the present invention is the nonaqueous secondary battery with the further feature that the protective layer consists of an insulative high-molecular substance and at least one material selected from a group consisting of, electronically conductive carbon, semiconductor material, and electrically conductive oxide, together with a filler material, which have been dispersed in the insulative high-molecular substance.

An embodiment of the present invention is the nonaqueous secondary battery with the further feature that the filler material is at least one item selected from a group consisting of polyimide powder and alumina powder.

An embodiment of the present invention is the nonaqueous secondary battery with the further feature that the powder of the carbon for the protective layer has specific surface area of no more than 40 $m^2/g$.

Thanks to possessing the structure above, the present invention exerts excellent effects which will now be described. With the invention should burr formed on the edges of the opposite-polarity electrode, or powder or the like that has separated from the electrode, pierce the separator and contact the electrode of one polarity, the burr, etc., will contact against the protective layer initially provided on the electrode of one polarity, thanks to which it will be possible to avert abnormal heat generation in the battery by having the battery discharge gently, and moreover it will be possible to have the equipment detect the abnormality in the battery via the fall in the battery's voltage.

With the invention, the aluminum or alloy with aluminum as primary constituent are items that have long been in general use for the collector of the positive electrode in a lithium ion battery or other nonaqueous secondary battery, and therefore positive electrode of the same stable characteristics can be obtained as with related art nonaqueous secondary batteries.

With the invention, the metal oxide is an item that has long been in general use as the positive electrode active material in a lithium ion battery or other nonaqueous secondary battery, and therefore a nonaqueous secondary battery with high charging potential can be obtained.

With the invention, the carbonaceous material serving as the negative electrode active material has discharge potential comparable to lithium metal or lithium alloy while not being prone to dendrite growths, thanks to which a nonaqueous secondary battery, can be obtained that exerts excellent effects, having high safety and excelling in initial efficiency, besides also having good potential flatness and furthermore, high energy density.

With the invention, for the negative electrode it is possible to select provision of the carbon-based active material compound layer not only on both sides, but also on one side only, of the metal foil, as desired, and hence the degree of freedom in battery design is increased.

With the invention, the negative electrode's collector, which is composed of metal foil made of copper or an alloy with copper as primary constituent, nickel or an alloy with nickel as primary constituent, or stainless steel, has long been in general use as a collector for a carbon-based negative electrode active material in a lithium ion battery or other nonaqueous secondary battery, so that a nonaqueous secondary battery can be obtained that has stable negative electrode characteristics.

With the invention, a nonaqueous secondary battery can be obtained that exerts the effects of the invention, both in the case of a nonaqueous secondary battery having a rolled electrode array and in that of nonaqueous secondary battery having a stacked electrode array. Particularly if the nonaqueous secondary battery having a rolled electrode array is employed, it will be possible to obtain a current pathway from most portions of the collector edge surfaces, so that the structure will be favorable for a high-output battery. Since this structure entails metal being exposed over a long extent in the roll direction and a high probability of short circuits occurring due to burr or the like, its possession of the protective layer of the present invention will be particularly effective.

With the invention, the fact that powder of an inorganic material such as electronically conductive carbon, semiconductor material or electrically conductive oxide is dispersed in the insulative high-molecular substance means that it is a simple matter to form a protective layer that has lower electronic conductivity than the metal composing the collector, and that moreover is made of non-insulative material. Particularly if at least one item selected from a group consisting of polyimide, polyamideimide and polyvinylidene fluoride is used as the insulative high-molecular substance, it will be possible to form with especial efficacy a protective layer made of non-insulative material.

With the invention, because the protective layer uses an insulative high-molecular substance, a carbon material that imparts conductivity to the insulative high-molecular substance, and a filler material, differences in color arise among the protective layer, the active material compound layer and the collector after drying, so that via optical sensors it is possible to detect clearly the boundaries between the active material compound layer and the collector, and between the protective layer and the active material compound, which means that during manufacture of the nonaqueous secondary battery it will be possible, using optical sensors and an image processing system, to detect stacking deviations or rolling deviations in the electrode plate arrays automatically, and thereby the manufacturing efficiency of nonaqueous secondary batteries will be enhanced. If at least one item selected from a group consisting of polyimide powder and alumina powder is used as the filler material, the protective layer can be colored particularly effectively, and hence it will be possible to detect even more clearly the boundaries between the active material compound layer and the collector, and between the protective layer and the active material compound.

With the invention, the fact that the specific surface area of the carbon material is no more than 40 $m^2/g$ means that the boundary between the protective layer and the active material compound can be detected reliably via optical sensors. This is because in cases where the carbon material's specific surface area exceeds 40 $m^2/g$, the protective layer and the active material compound are both the same black color, which makes detecting the boundary between the two problematic for optical sensors. Also, a lower limit of 1.5 $m^2/g$ will preferably be set for the carbon material's specific surface area, since if it is below 1.5 $m^2/g$, the carbon material's particle size will be so large that coatability with the protective layer will be poor.

DESCRIPTION OF THE PREFERRED EMBODIMENTS

The best mode for carrying out the present invention will now be described in detail using exemplary embodiments and comparative experiments. It will be understood however that the embodiments presented below merely illustrate nonaqueous secondary batteries that embody the technical concepts of the present invention. The embodiments are not intended to restrict the present invention to these nonaqueous secondary batteries. The present invention can be applied equally well in numerous other variants without departing from the technical concepts set forth in the claims.

First Embodiment

Figure 1:
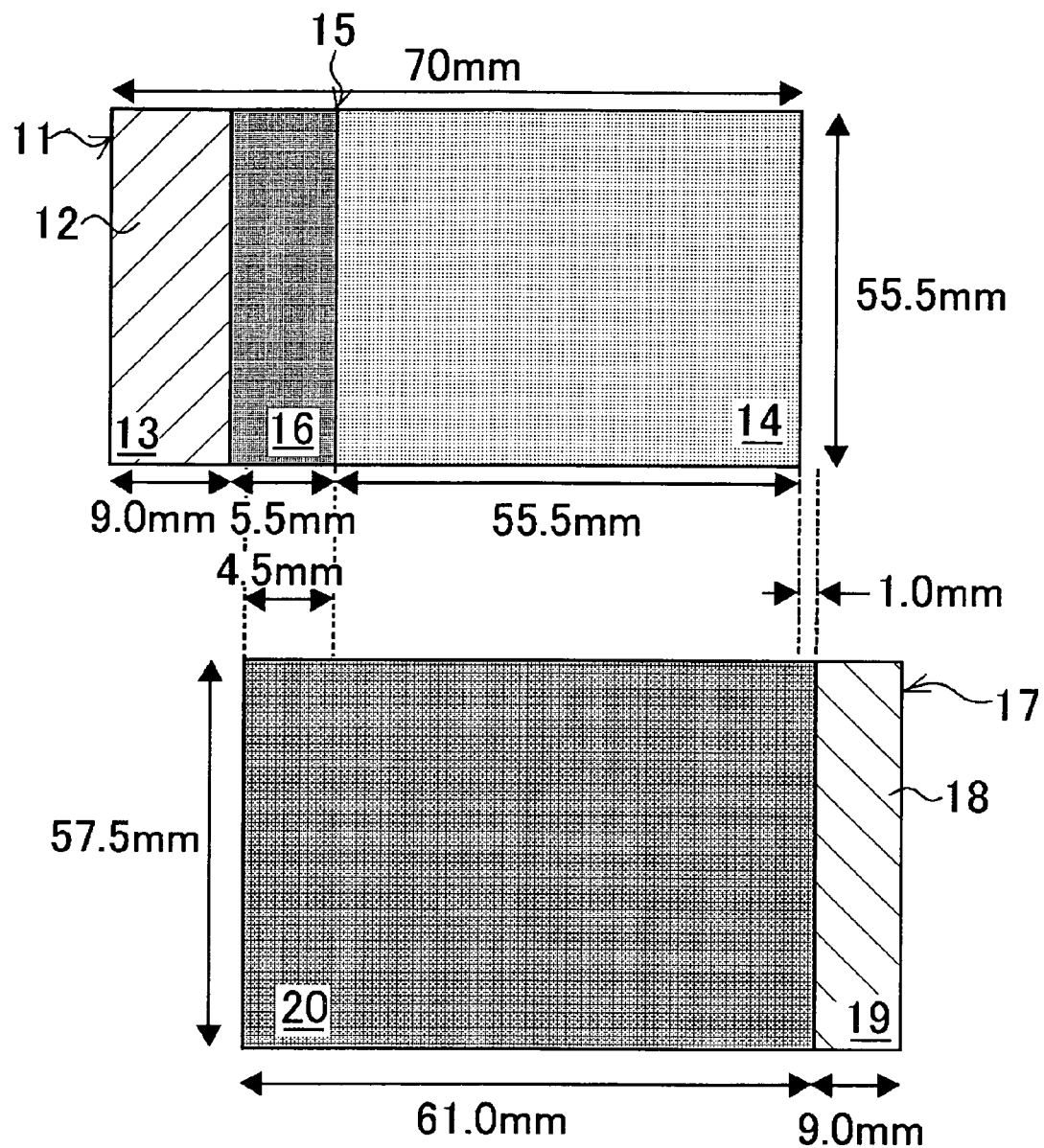
FIG. 1 is a plan view illustrating the electrode dimensions in the nonaqueous secondary battery of a first embodiment.
Figure 2:
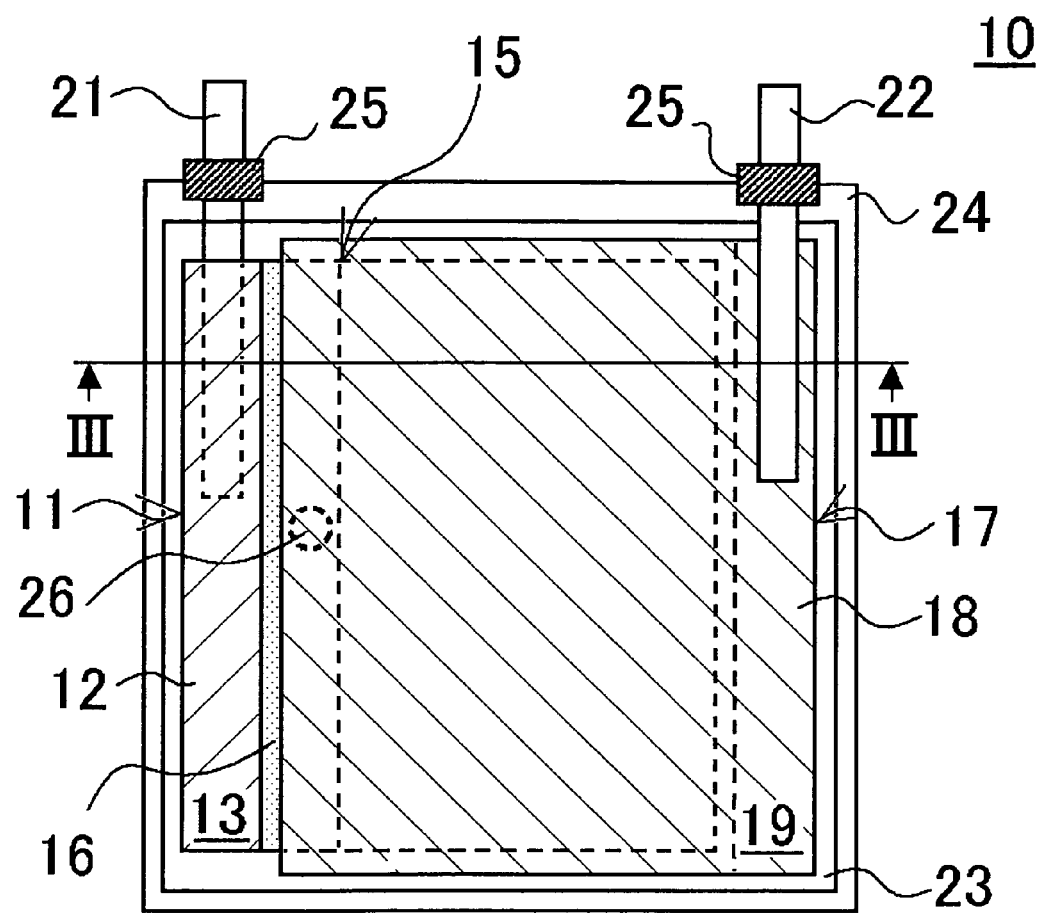
FIG. 2 is a top view seen through the outer case, illustrating the in outline the structure of the nonaqueous secondary battery of the first embodiment.
Figure 3:
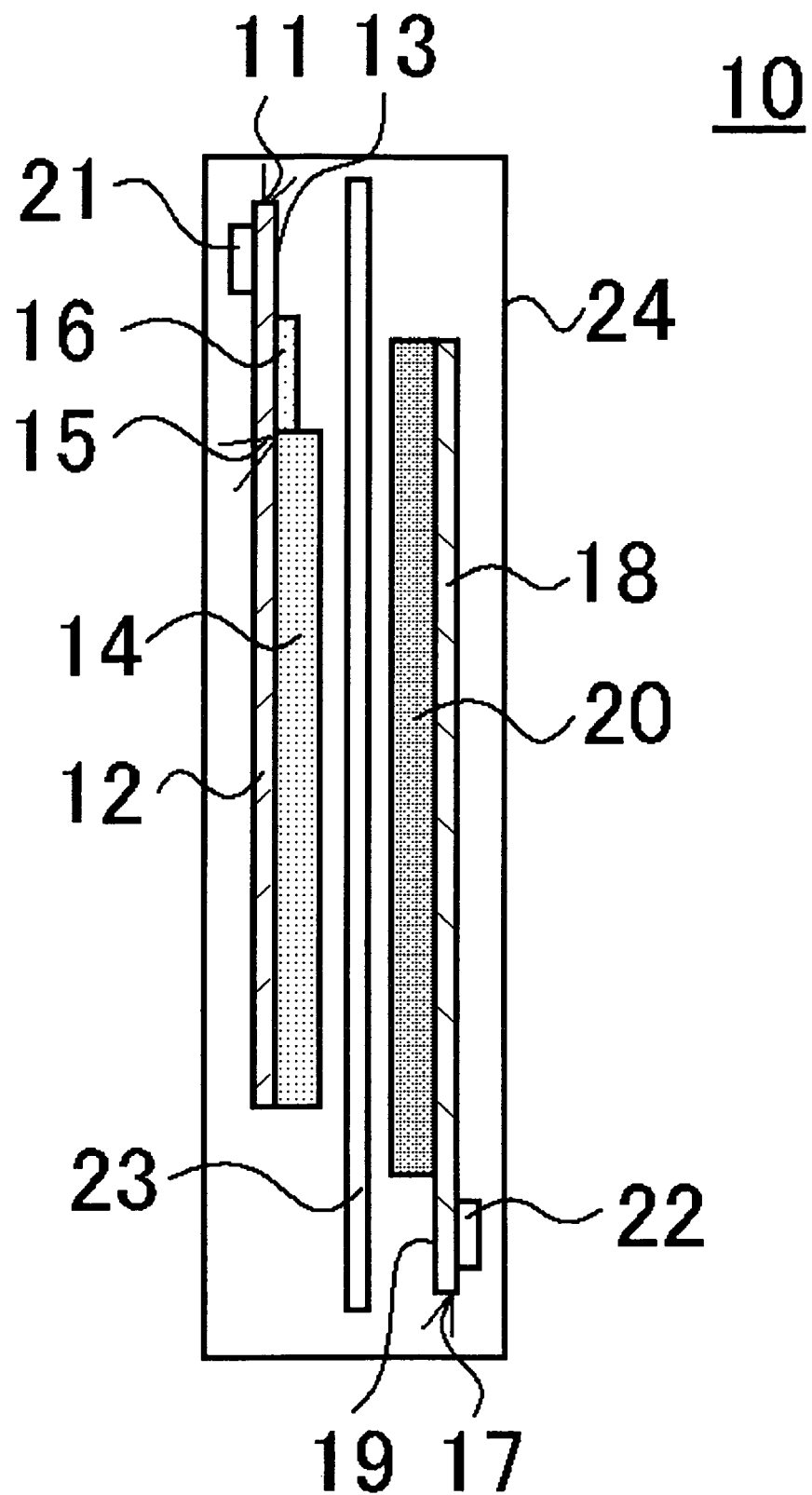
FIG. 3 is a cross-sectional view along III-III in FIG. 2.

First will be described, with reference to FIGS. 1 to 3, the method of fabricating a nonaqueous secondary battery that was used in the first embodiment. FIG. 1 is a plan view illustrating the electrode dimensions in the nonaqueous secondary battery of the first embodiment, FIG. 2 is a top view seen through the outer case, illustrating in outline the structure of the nonaqueous secondary battery of the first embodiment, and FIG. 3 is a cross-sectional view along III-III in FIG. 2.

(Fabrication of Positive Electrode)

The positive electrode 11 was fabricated as follows. First, an active material compound slurry was prepared by mixing 94% by mass of positive electrode active material composed of compound oxides of lithium, nickel, cobalt and manganese with 3% by mass of powdered acetylene black, graphite or other carbon and 3% by mass of a bonding agent constituted of polyvinylidene fluoride (PVdF), then adding N-methylpyrrolidone (NMP) to the resulting mixture and kneading it. This active material compound slurry was then applied evenly to one face of the positive electrode collector 12 made of 20 µm thick aluminum foil so as to leave, at the edges of the electrode, a portion 13 where the aluminum foil was exposed, thus forming a positive electrode plate coated with an active material layer 14. Following that, the positive electrode plate coated with the active material layer 14 was passed through a drying machine, where the organic solvent that had been needed for preparation of the slurry was removed and the plate was dried. Afterward, the dried positive electrode plate was rolled with a roller press into a 0.06 mm thick positive electrode plate.

Next, masking tape was applied to the exposed aluminum foil portion 13 at a distance of 5.5 mm from the boundary 15 between the active material coated portion and the exposed portion, and a slurry with N-methylpyrrolidone as solvent and polyimide plus 70 $m^2/g$ specific surface are carbon powder mixed so as to be in the ratio of 1:1 was applied between the active material coated portion and the masking tape and allowed to dry, thus providing a protective layer 16. The electrode fabricated in this manner was cut to dimensions of 55.5 mm×70 mm, and thus a positive electrode 11 was obtained that was provided with a 9 mm wide strip-form exposed aluminum foil portion 13 and a 5.5 mm wide strip-form protective layer 16. It was verified with a surface resistance meter that the protective layer 16 had greater resistance than the aluminum foil.

(Fabrication of Negative Electrode)

The negative electrode 17 was fabricated as follows. First, a slurry was prepared by mixing 98% by mass of graphite powder with 1% by mass each of carboxymethylcellulose and styrene-butadiene rubber, then adding water and kneading. This slurry was then applied evenly to one face of the negative electrode collector 18 made of 12 µm thick copper foil so as to leave, at the edges of the electrode, a portion 19 where the copper foil was exposed, thus forming a negative electrode plate coated with a negative electrode active material layer 20. Following that the negative electrode plate coated with the negative electrode active material layer 20 was passed through a drying machine, where the organic solvent that had been needed for preparation of the slurry was removed and the plate was dried. Afterward, the dried negative electrode plate was rolled with a roller press into a 0.05 mm thick negative electrode plate. The electrode thus obtained was cut to dimensions of 55.5 mm×70 mm, and thus a negative electrode 17 was obtained that was provided with a 9 mm wide strip-form exposed copper foil portion 19, as shown in FIG. 1.

(Preparation of Electrolyte Fluid)

The electrolyte fluid was prepared by dissolving $LiPF_6$ so as to constitute 1 mole per liter in a solvent of ethylene carbonate and diethyl carbonate mixed in the proportion of 3:7 by volume.

(Fabrication of Battery)

Fabrication of the battery up to the stage prior to pouring of the electrolyte was as follows. An aluminum collecting tab 21 and a nickel collecting tab 22 were connected to the positive electrode's exposed aluminum foil portion 13 and the negative electrode's exposed copper foil portion 19 respectively; the positive electrode, the negative electrode and a 0.022 mm thick polyethylene porous separator 23 were stacked and inserted in a laminated-film outer case 24; the lead-out portions of the aluminum collecting tab 21 and nickel collecting tab 22 were each sealed via thin sealant 25; and in addition two other directions were sealed, with the remaining direction left as a fluid inlet. Such pre-electrolyte battery was dried in a vacuum, after which, inside a dry box in an argon atmosphere, electrolyte fluid was poured in and pressure was successively applied and reduced so as to remove air bubbles and allow the electrolyte to permeate. Afterward, the fluid inlet was sealed. The structure of the completed battery 10 was as shown in FIGS. 2 and 3.

Figure 4:
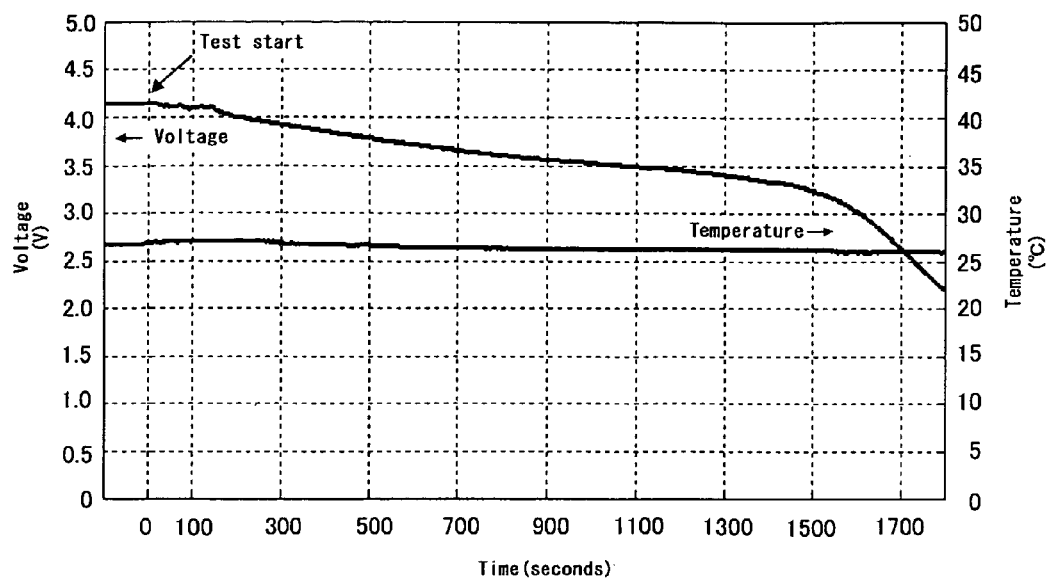
FIG. 4 is a graph showing the changes over time in the behavior of the nonaqueous secondary battery of the first embodiment.

The battery 10 thus obtained was subjected to constant current charging at 25° C. with constant current of 50 mA until the battery voltage reached 4.2 V, after which charging with constant voltage of 4.2 V was implemented for 2 hours. Then a part of the charged battery's laminated case was cut open, and a 3 mm diameter hole was cut in the separator in the area where the positive electrode 11's protective layer 16 overlaps the negative electrode 17 (the broken-line circle portion indicated with reference numeral 26 in FIG. 2), and an alumina rod 1 mm in diameter was inserted into the hole from the negative electrode's inner face so as to make the protective layer 16 and the negative electrode 17 contact. The battery surface temperature and voltage at this time were measured to verify the battery behavior. The changes in the battery behavior over time are shown in FIG. 4, while the battery voltage and temperature rise results for 5 minutes after the test start are given in Table 1 below.

(First Comparative Experiment)

Figure 5:
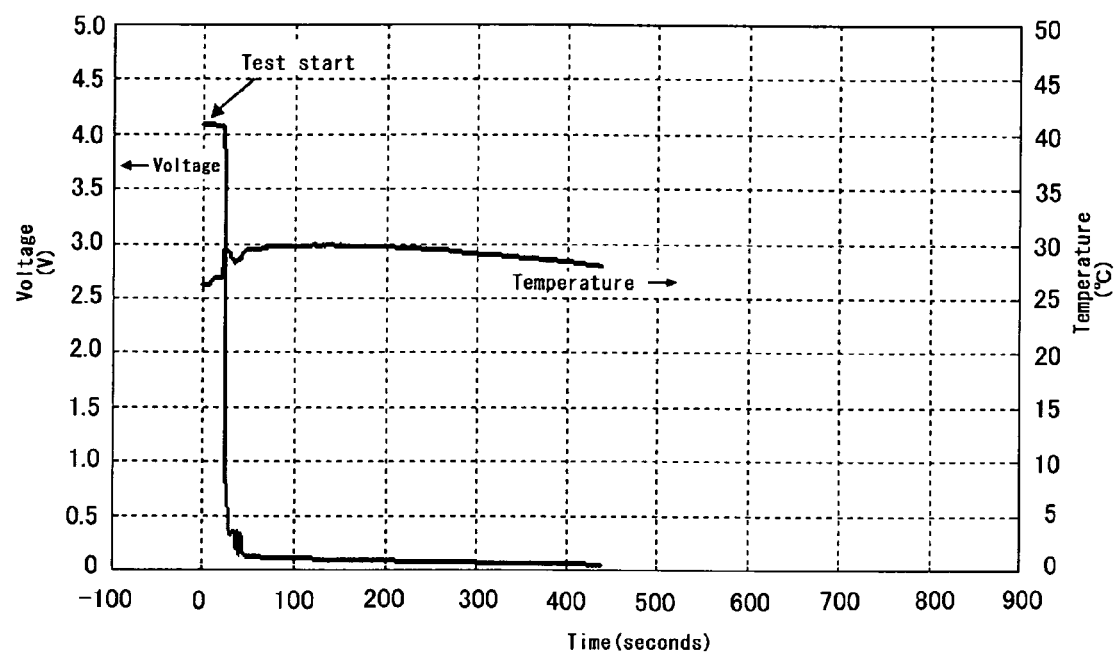
FIG. 5 is a graph showing the changes over time in the behavior of the nonaqueous secondary battery of a first comparative experiment.

The nonaqueous secondary battery of the first comparative experiment was fabricated using the same procedure as for the first embodiment, except that in the process of fabricating the positive electrode, the aluminum foil was retained as it was at the parts where in the first embodiment a protective layer was provided. The battery obtained was subjected to constant current charging at 25° C. with constant current of 50 mA until the battery voltage reached 4.2 V, after which charging with constant voltage of 4.2 V was implemented for 2 hours. Then a part of the charged battery's laminated case was cut open, and a 3 mm diameter hole was cut in the separator in the area where the positive electrode's exposed aluminum foil part overlaps the negative electrode (portion corresponding to the broken-line circle indicated with reference numeral 26 in FIG. 2), and an alumina rod 1 mm in diameter was inserted into the hole from the negative electrode's inner face so as to make the exposed aluminum foil part and the negative electrode contact. The battery surface temperature and voltage at this time were measured to verify the battery behavior. The changes in the battery behavior over time are shown in FIG. 5, while the battery voltage and temperature rise results for 5 minutes after the test start are given alongside the first embodiment results in Table 1 below.

(Second Comparative Experiment)

The nonaqueous secondary battery of the second comparative experiment was fabricated using the same procedure as for the first embodiment, except that in the process of fabricating the positive electrode, the protective layer of the first embodiment was changed. Specifically, instead of the protective layer fabricated in the first embodiment, an insulating layer was provided as a protective layer, through application of a slurry obtained by mixing polyimide into a N-methylpyrrolidone solvent. This insulating layer was substantially the same as the insulating layer disclosed in Japanese Laid-Open Patent Publication No. 2001-093583.

The battery obtained was subjected to constant current charging at 25° C. with constant current of 50 mA until the battery voltage reached 4.2 V, after which charging with constant voltage of 4.2 V was implemented for 2 hours. Then a part of the charged battery's laminated case was cut open, and a 3 mm diameter hole was cut in the separator in the area where the positive electrode's protective layer overlaps the negative electrode (portion corresponding to the broken-line circle indicated with reference numeral 26 in FIG. 2), and an alumina rod 1 mm in diameter was inserted into the hole from the negative electrode's inner face so as to make the protective layer and the negative electrode contact. The battery surface temperature and voltage at this time were measured to verify the battery behavior. The changes in the battery behavior over time are shown in FIG. 6, while the battery voltage and temperature rise results for 5 minutes after the test start are given alongside the first embodiment results in Table 1 below.

TABLE 1

Figure 6:
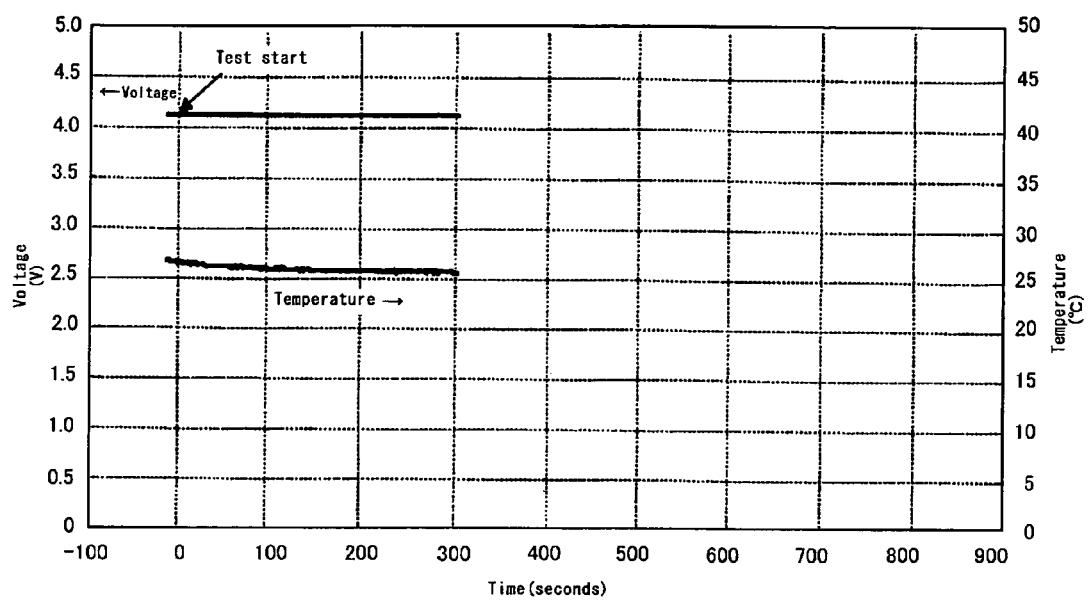
FIG. 6 is a graph showing the changes over time in the behavior of the nonaqueous secondary battery of a second comparative experiment.

| Test 1 | Battery voltage after 5 min. | Temperature rise | Change curve |
| --- | --- | --- | --- |
| 1$^{st}$ embodiment | 3.9 V | None | FIG. 4 |
| 1$^{st}$ comparative experiment | 0.1 V | +4° C. | FIG. 5 |
| 2$^{nd}$ comparative experiment | 4.2 V | None | FIG. 6 |

From the results set forth in Table 1 and FIGS. 4 to 6, the following matters are evident. Namely, the nonaqueous secondary battery of the first embodiment shows a gentle fall in battery voltage over time in the event of a short circuit, whereas with the nonaqueous secondary battery of the first comparative experiment, in the event of a short circuit the voltage falls abruptly to 0.1 V and the battery surface's temperature rises 4° C. Thus, when the protective layer according to the present invention is provided, abrupt temperature rise is curbed, and moreover the battery is made to discharge gently, in the event of a short circuit.

With the nonaqueous secondary battery of the second comparative experiment, on the other hand, the fact that the protective layer was an insulating layer meant that no change was observed even though the negative electrode contacted with the positive electrode's insulating layer and the insulating layer was damaged. Accordingly, measurements were halted at 5 minutes (300 seconds), as shown in FIG. 6. The nonaqueous secondary battery of the second comparative experiment is able to charge/discharge even in a state where damage or rupturing has occurred in the separator.

Under such conditions, should dropping or vibration, etc., of the device cause progression of rupturing in the separator and deformation of the electrodes, or dislodging of an insulating layer facing a ruptured separator, with the result that the positive electrode collector and the negative electrode contact and produce a short circuit, there is a possibility that a major short circuit will occur as in the first comparative experiment. Accordingly, in order to simulate conditions of the above kind in the nonaqueous secondary batteries of the first embodiment and the second comparative experiment after the above-described tests had been conducted, 1 hour after the test start a 5 mm diameter exfoliation was made in the protective layer (first embodiment) or insulating layer (second comparative experiment) in the area around the place where the 3 mm diameter hole was made in the separator, and such exfoliation was pierced with a 1 mm diameter alumina rod inserted from the negative electrode inner face, so as to make the positive electrode collector contact with the negative electrode and cause a short circuit. The battery surface temperature and voltage at this time were measured to verify the battery behavior. The changes in the battery behavior over time are shown in FIG. 7 (for the first embodiment) and FIG. 8 (for the second comparative experiment), while the battery voltage and temperature rise results for 5 minutes after the test start are compiled in Table 2 below.

TABLE 2

Figure 7:
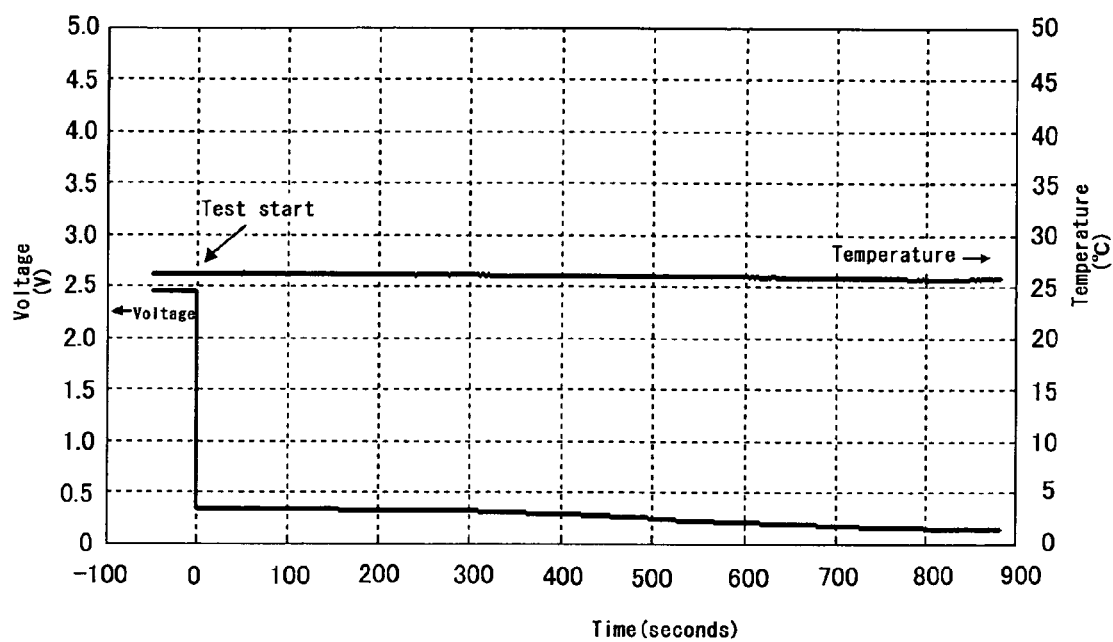
FIG. 7 is a graph showing another set of changes over time in the behavior of the nonaqueous secondary battery of the first embodiment.
Figure 8:
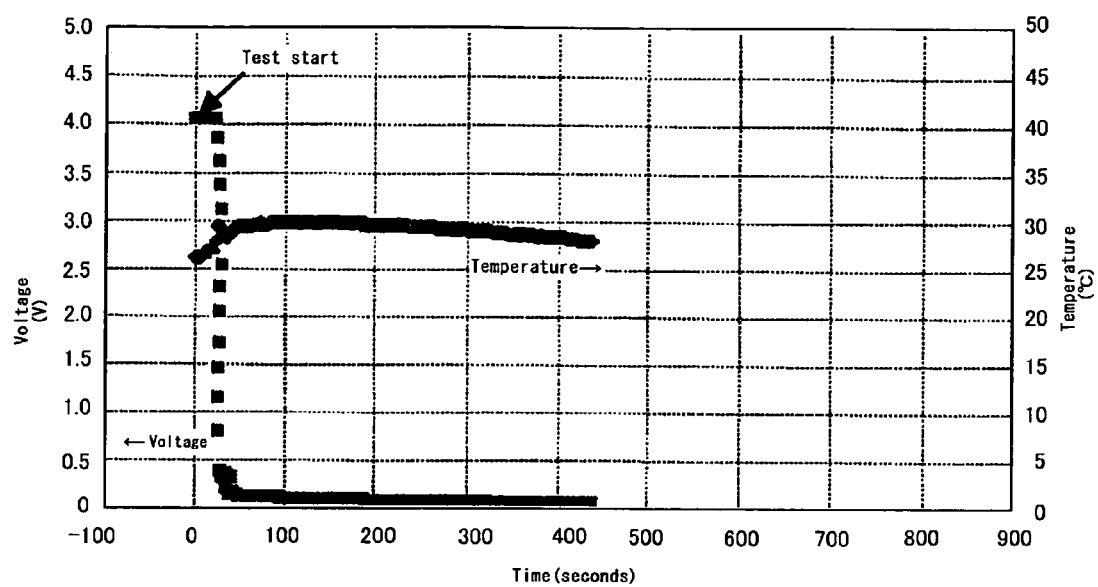
FIG. 8 is a graph showing another set of changes over time in the behavior of the nonaqueous secondary battery of the second comparative experiment.

| Test 2 | Battery voltage after 5 min. | Temperature rise | Change curve |
|---|---|---|---|
| 1st embodiment | 0.3 V | None | FIG. 7 |
| 2nd comparative experiment | 0.1 V | +4° C. | FIG. 8 |

From the results set forth in Table 2, the following matters are evident. Namely, with the nonaqueous secondary battery of the first embodiment, no battery temperature rise was observed when a short circuit was caused, whereas with the nonaqueous secondary battery of the second comparative experiment a temperature rise of 4° C. was observed after a short circuit. Because the electronic conductivity of the protective layer used in the nonaqueous secondary battery of the first embodiment is lower than the electronic conductivity of the aluminum foil that serves as the positive electrode collector, once a hole or dent occurs in the separator due to burr or the like, the nonaqueous secondary battery of the first embodiment will gently and continuously discharge, so that the battery voltage will fall gradually (see Table 1 and FIG. 4), which means that even if, in such a state, the positive electrode collector and the negative electrode directly contact and produce a short circuit because, due to dropping or vibration of the device, a rupture develops in the separator the electrodes become deformed, or the protective layer facing the ruptured separator becomes dislodged, no rise in the battery surface temperature will be observed, since no large current will be flowing. Since such falling of the battery voltage can be sensed with ease, it will be easy to have the equipment in which a nonaqueous secondary battery of the first embodiment is used sense abnormality in the battery.

By contrast, with the battery of the second comparative example, should a hole or dent occur in the separator due to burr or the like, the battery will be in a state in which it can be charged or discharged, the battery voltage will not fall, and the battery will appear to function normally, as shown in FIG. 6. However if, in such a state, the positive electrode collector and the negative electrode directly contact and produce a short circuit because, due to dropping or vibration of the device, a rupture develops in the separator and the electrodes become deformed, or the insulating layer facing the ruptured separator becomes dislodged, the battery surface temperature will rise since a large current will be flowing. Thus, with the nonaqueous secondary battery of the second comparative example, which uses an insulating layer, occurrence of a hole or dent in the insulating layer cannot be sensed until the battery's positive and negative electrodes short-circuit, whereas with the nonaqueous secondary battery of the first embodiment, which uses a protective layer that has lower electronic conductivity than the positive electrode collector and moreover is non-insulative, occurrence of a hole or dent in the protective layer can be sensed from the fall in the battery voltage before the battery's positive and negative electrodes short-circuit, so that a nonaqueous secondary battery of excellent safety is obtained.

In the first embodiment above, a carbon material made of acetylene black with large specific surface area of 70 m$^2$/g was used as an example of the conductive particles which are one of the possible materials for forming the non-insulative protective layer. But although such non-insulative protective layer of the first embodiment produces satisfactory effects from the viewpoint of assuring safety, the colors of the protective layer and active material compound layer after drying are substantially the same black color, which makes it problematic to detect the boundary between the protective layer and the active material compound layer, even using optical sensors. Accordingly, in the second to fifth embodiments below, the properties of the material forming the protective layer were varied in numerous ways so as to verify the conditions under which optical sensors could sense the boundary between the protective layer and the active material compound layer, and the conditions under which they could sense the boundary between the protective layer and the collector.

Second Embodiment

An active material compound slurry was prepared by mixing 94% by mass of positive electrode active material composed of compound oxides of lithium, nickel, cobalt and manganese with 3% by mass of powdered acetylene black, graphite or other carbon and 3% by mass of a bonding agent constituted of PVdF, then adding NMP to the resulting mixture and kneading it. This active material compound slurry was then applied evenly to one face of the positive electrode collector 12 made of 20 µm thick aluminum foil so as to leave, at the edges of the electrode, a portion 13 where the aluminum foil was exposed, thus forming a positive electrode plate coated with an active material layer 14. Following that, the positive electrode plate coated with the active material layer 14 was passed through a drying machine, where the organic solvent that had been needed for preparation of the slurry was removed and the plate was dried. Afterward, the dried positive electrode plate was rolled with a roller press into a 0.06 mm thick positive electrode plate 11.

Following that, using NMP as solvent, 5.0 g of polyimide varnish containing 20% by mass of polyimide was mixed with 0.1 g of carbon powder with specific surface area 40 m$^2$/g as conductive material, and further NMP was added so that the whole mixture amounted to 25.1 g. A protective layer was then fabricated by applying this mixture was evenly to 20 µm thick aluminum foil with a 50 µm thick doctor blade and drying it. The positive electrode and protective layer thus fabricated were cut into particular widths, and experiments were conducted to see if the respective boundaries among the aluminum foil, positive electrode active material layer and protective layer could be determined using optical sensors. The results are compiled alongside those of other embodiments in Table 3.

Third Embodiment

In the third embodiment, a protective layer was fabricated using the same procedure as in the second embodiment except for the preparation of the protective material, which was prepared as follows. In an NMP solvent, 1 g of polyimide powder and 0.1 g of carbon powder with specific surface area 40 m$^2$/g were mixed into 20 g of binder solution containing 5% by mass of PVdF, and further NMP was added so that the whole mixture amounted to 25.1 g. As with the second embodiment above, the results of the experiments using optical sensors are compiled alongside those of other embodiments in Table 3.

Fourth Embodiment

In the fourth embodiment, a protective layer was fabricated using the same procedure as in the second embodiment except for the preparation of the protective material, which was prepared as follows. In an NMP solvent, 1 g of polyimide powder and 0.1 g of carbon powder with specific surface area 40 m²/g were mixed into binder solution containing 21.1% by mass of polyamideimide, and further NMP was added so that the whole mixture amounted to 25.1 g. As with the second embodiment above, the results of the experiments using optical sensors are compiled alongside those of other embodiments in Table 3.

Fifth Embodiment

In the fifth embodiment, a protective layer was fabricated using the same procedure as in the second embodiment except for the preparation of the protective material, which was prepared as follows. In an NMP solvent, 1 g of alumina powder and 0.1 g of carbon powder with specific surface area 40 m²/g were mixed into binder solution containing 21.1% by mass of polyamideimide, and further NMP was added so that the whole mixture amounted to 25.1 g. As with the second embodiment above, the results of the experiments using optical sensors are compiled alongside those of other embodiments in Table 3.

the specific surface area of at least the carbon material should preferably be 40 m²/g or lower. This is because use of a carbon material with specific surface area within such range for the protective layer will enable stacking deviations or rolling deviations in the electrode arrays to be detected automatically by means of optical sensors and an image processing system during manufacture of the nonaqueous secondary battery, thus yielding the beneficial effect of raising the manufacture efficiency of the nonaqueous secondary battery, in addition to the beneficial effect of raising the safety of a nonaqueous secondary battery that the provision of a protective layer produces.

Sixth Embodiment

The foregoing account of the first embodiment described, for exemplary purposes, fabrication of a stacked battery in which the positive electrode and the negative electrode were each single-layer, but the battery of the present invention is not limited to any particular form or structure; the invention can also be applied in stacked batteries having multiple electrodes stacked upon each other, or to cylindrical batteries having a rolled electrode array, among various others. For the

TABLE 3

| | Binder | Filler material | Carbon material specific surface area | Surface resistance ($\Omega$) | Color | Detection by optical sensor | |
|---|---|---|---|---|---|---|---|
| | | | | | | Protective layer-collector | Protective layer-active material |
| 1st embodiment | Polyimide | None | 70 m²/g | $10^3$ | Black | ○ | X |
| 2nd embodiment | Polyimide | Polyimide powder | 40 m²/g | $10^3$ | Green | ○ | ○ |
| 3rd embodiment | PVdF | Polyimide powder | 40 m²/g | $10^3$ | Green | ○ | ○ |
| 4th embodiment | Polyamideimide | Polyimide powder | 40 m²/g | $10^3$ | Green | ○ | ○ |
| 5th embodiment | Polyamideimide | Alumina powder | 40 m²/g | $10^3$ | Gray | ○ | ○ |

The results in Table 3 verified that that with the second to fifth embodiments, which used carbon material having-small specific surface area (large particle size), the post-drying color of the protective layer is clearly distinguishable from that of the active material compound layer, and therefore that it is possible, via image processing using optical sensors, to detect with ease the boundaries between the protective layer and the collector and between the protective layer and the active material compound layer.

With the first embodiment, the carbon material had a large specific surface area of 70 m²/g (small particle size), so that its post-drying color was the same black color as that of the protective layer, which made it problematic to identify the boundary between the protective layer and the active material compound automatically using optical sensors. When the carbon material's 70 m²/g specific surface area was gradually lowered (the particle size was gradually increased), the color changed from black to green or gray, and at specific surface areas below 40 m²/g it became substantially possible to identify the boundary between the protective layer and the active material compound without error using optical sensors.

Figure 9:
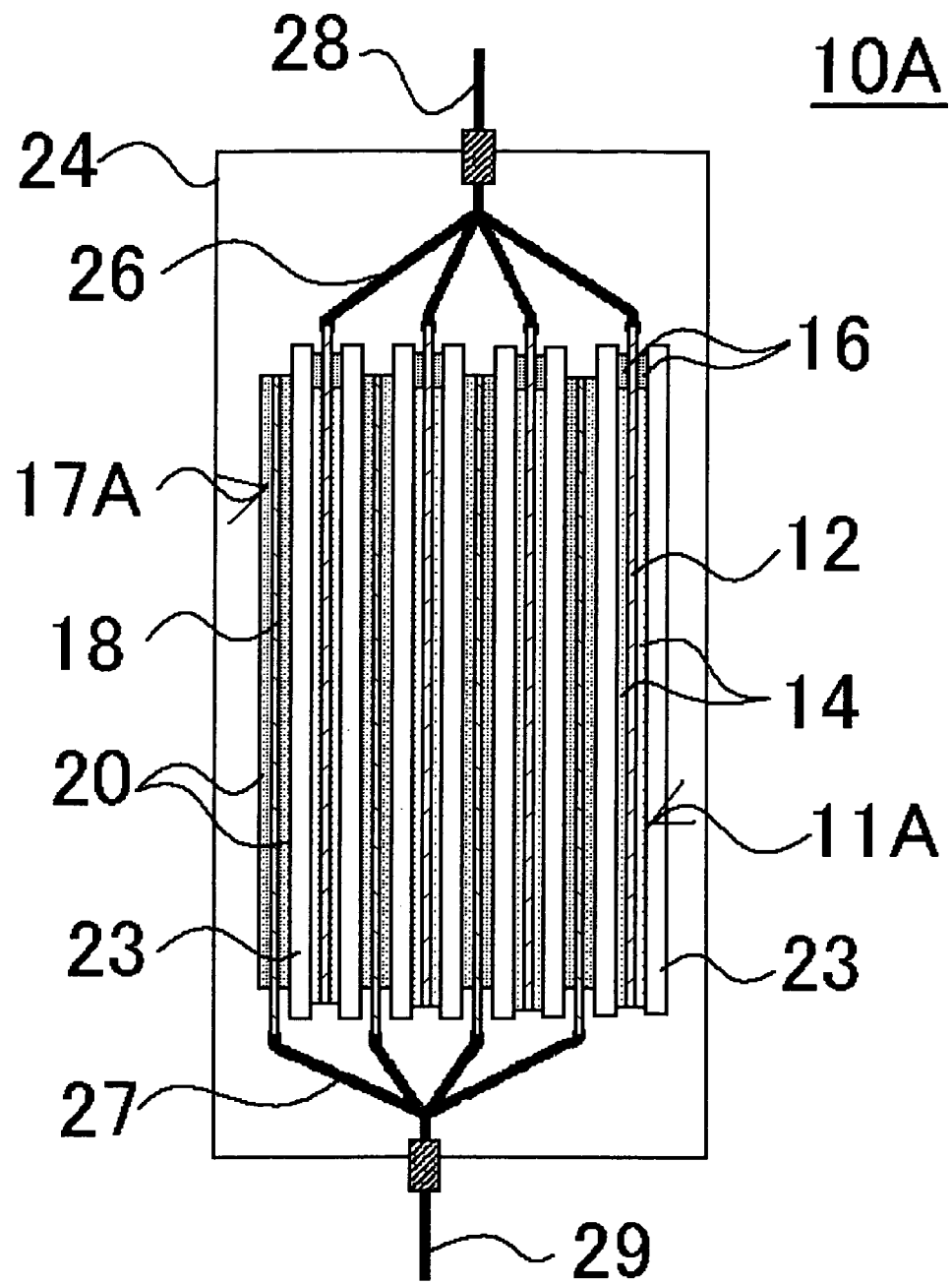
FIG. 9 is a cross-sectional view of the nonaqueous secondary battery of a sixth embodiment.

Further, while the protective layer's color varies not only with its carbon material but also with the properties of the filler material, it was found that within the protective layer, sixth embodiment, a stacked-construction nonaqueous secondary battery 10A was fabricated. This nonaqueous secondary battery 10A of the sixth embodiment will now be described using FIG. 9; elements similar to those in the nonaqueous secondary battery 10 of the first embodiment as shown in FIGS. 1 to 3 are denoted by the same reference numerals, and detailed descriptions thereof are omitted. FIG. 9 is a longitudinal cross-sectional view of the nonaqueous secondary battery having a stacked construction of the sixth embodiment.

The positive electrodes 11A of the nonaqueous secondary battery 10A of the sixth embodiment were fabricated in the same manner as the positive electrode in the first embodiment, except that on both faces of the positive electrode collector 12 a positive electrode active material layer 14 was provided, and also a protective layer 16 that had lower electronic conductivity than the metal of the positive electrode collector 12 and moreover that was non-insulative was provided. Likewise the negative electrodes 17A were fabricated in the same manner as the negative electrode in the first embodiment, except that a negative electrode active material layer 20 was provided on both faces of the negative electrode collector 18. The nonaqueous secondary battery 10A of the sixth embodiment used 4 pairs each of such positive electrodes 11A and negative electrodes 17A, and was fabricated as follows. The collectors of the same polarity were arranged so as to extend in the same direction; the electrode pairs were stacked together with a separator 23 placed between them to effect insulation; the positive electrodes' collectors were connected to one another via collecting plates 26 and the negative electrodes' collectors connected to one another via collecting plates 27; then in the same manner as with the nonaqueous secondary battery 10 of the first embodiment, the electrolyte fluid was poured in, the electrodes were sealed in the laminated-film outer case 24, and a positive electrode terminal 28 and a negative electrode terminal 28 were drawn out.

The nonaqueous secondary battery 10A of the sixth embodiment also was provided, on those of the positive electrode 11A collector 12's exposed-metal portions that face the negative electrode 17 through the interposed separator 23, with a protective layer 16 made from material which has lower electronic conductivity than the metal of the positive electrode collector 12 and which moreover is non-insulative. Therefore this embodiment was able to provide a nonaqueous secondary battery of excellent safety that exerts similar effects to those of the nonaqueous secondary battery of the first embodiment.

Seventh Embodiment

Figure 10:
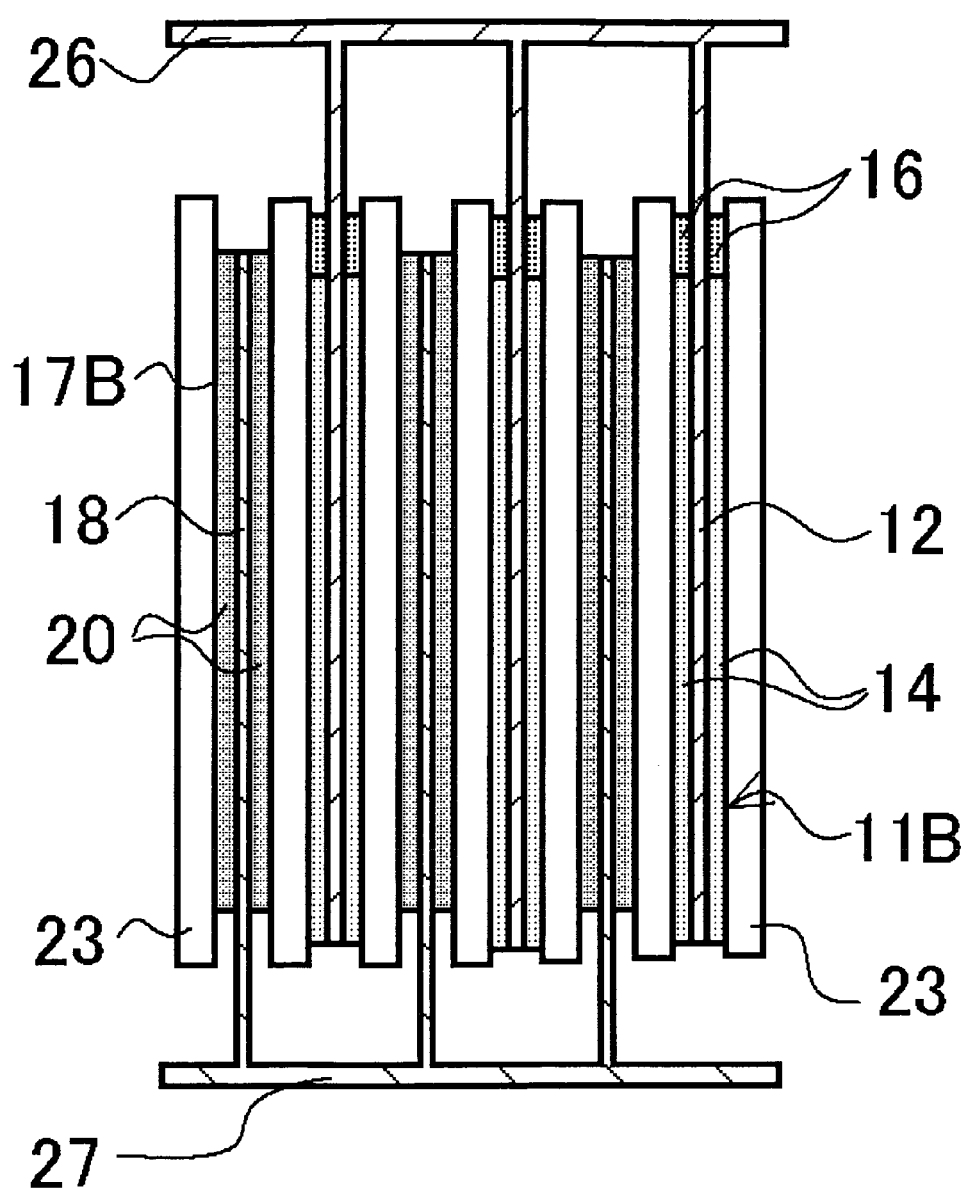
FIG. 10 is a partially enlarged cross-sectional view of the electrode portion of the nonaqueous secondary battery of a seventh embodiment.
Figure 11:
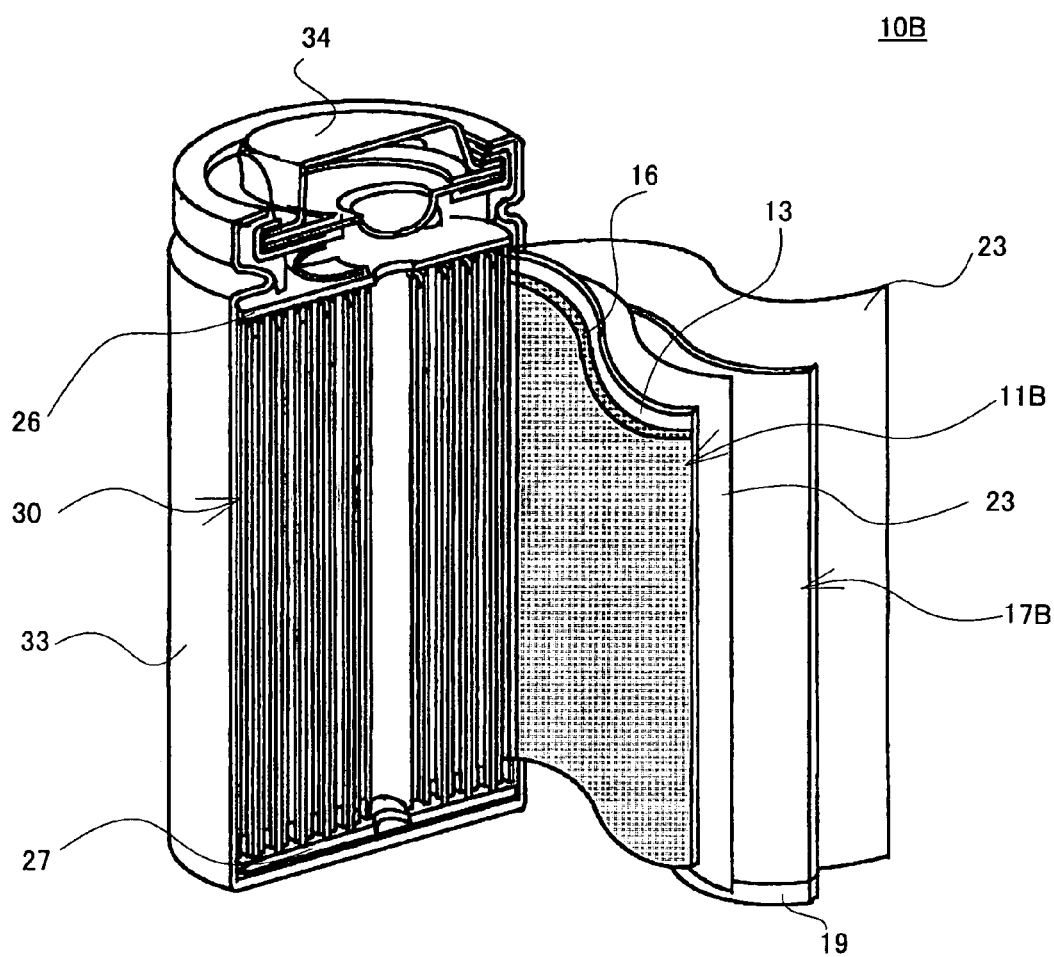
FIG. 11 is a perspective view illustrating the nonaqueous secondary battery of the seventh embodiment cut through in the longitudinal direction.
Figure 12:
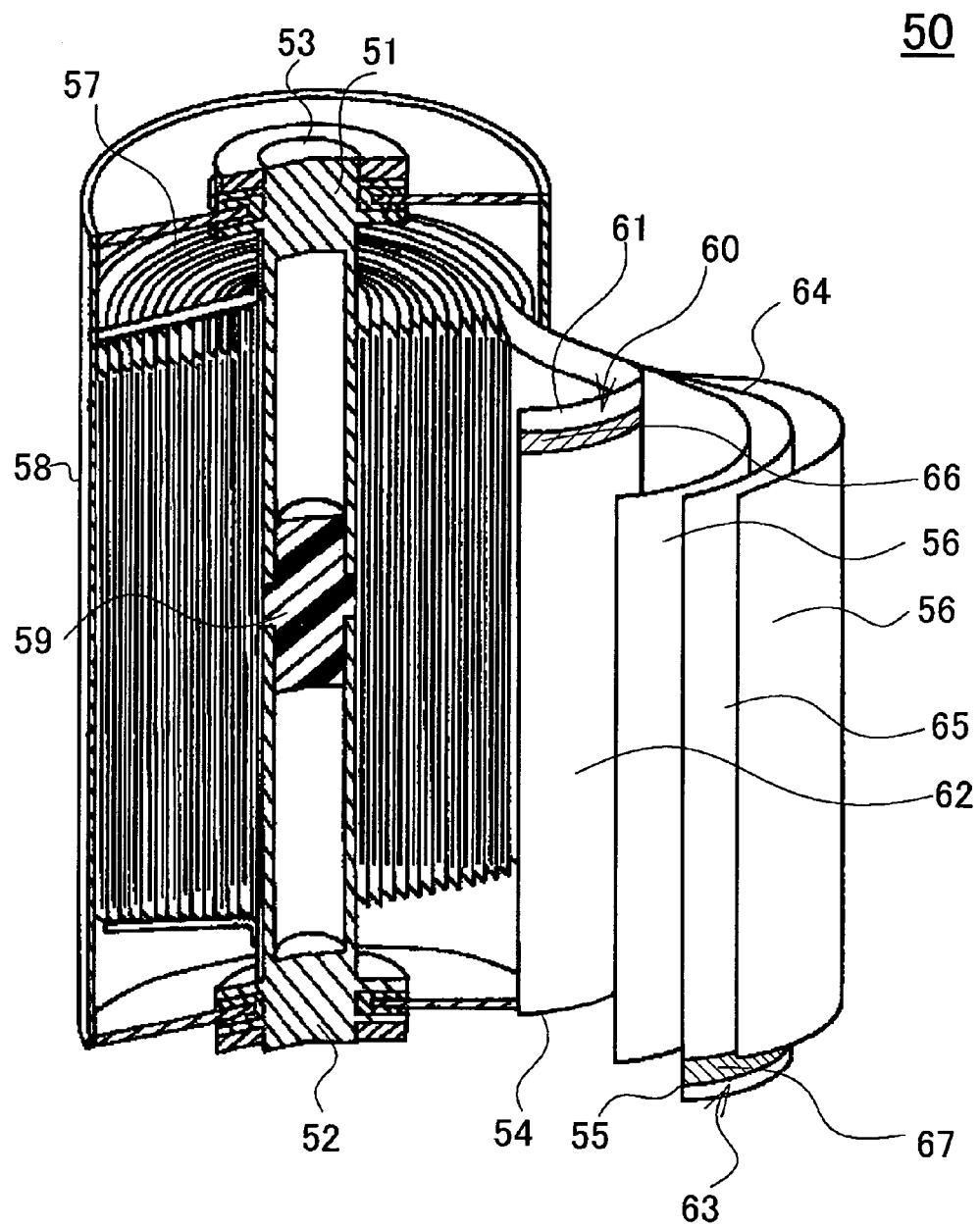
FIG. 12 is a cross-sectional perspective view of the whole of a nonaqueous secondary battery equipped with a related art rolled electrode array.
Figure 13:
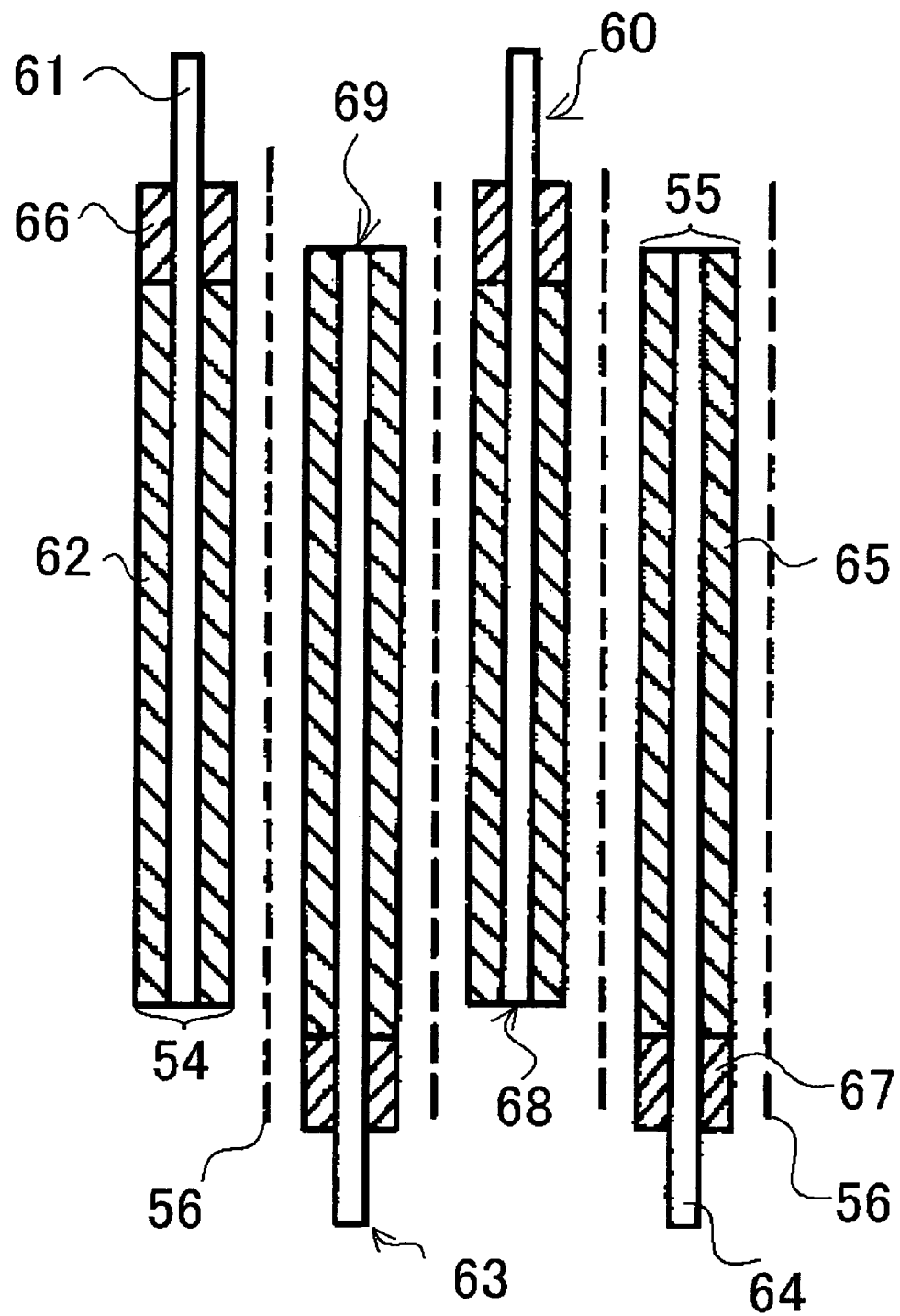
FIG. 13 is a cross-sectional schematic illustrating in outline the rolled electrode array in FIG. 12.

For the seventh embodiment, a nonaqueous secondary battery 10B equipped with a rolled electrode array was fabricated. This battery of the seventh embodiment will now be described using FIGS. 10 and 11; elements similar to those in the nonaqueous secondary battery 10 of the first embodiment as shown in FIGS. 1 to 3 are denoted by the same reference numerals, and detailed descriptions thereof are omitted. FIG. 10 is a partially enlarged cross-sectional view of the electrode portion of the nonaqueous secondary battery 10B of the seventh embodiment, while FIG. 11 is a perspective view showing the cylindrical nonaqueous secondary battery 10B of the seventh embodiment cut through in the longitudinal direction.

The positive electrodes 11B of the nonaqueous secondary battery 10B of the seventh embodiment were fabricated in the same manner as the positive electrode in the first embodiment, except that on both faces of the reed-shaped positive electrode collector 12 a positive electrode active material layer 14 was provided, and also a protective layer 16 which had lower electronic conductivity than the metal of the positive electrode collector 12 and which moreover was non-insulative was provided. Likewise the negative electrodes 17B were fabricated in the same manner as the negative electrode in the first embodiment, except that a negative electrode active material layer 20 was provided on both faces of the reed-shaped negative electrode collector 18.

Following that, an electrode roll 30 was fabricated by rolling the positive electrodes 11B and negative electrodes 17B over one another with separators 23 interposed therebetween, and collecting plates 26 and 27 were placed, respectively, at the top and bottom of the electrode roll 30, after which the resulting assembly was housed inside cylindrical battery outer case 33 made of steel, which also served as the negative electrode terminal. Then the exposed-metal portions 19 of the negative electrodes 17B were welded to the collecting plate 27, and the collecting plate 27 was welded to the bottom of the interior of the battery outer case 33. Similarly the exposed-metal portions 13 of the positive electrodes 11B were welded to the collecting plate 26, and the collecting plate 26 was welded to the base part of the stopper 34. Finally, a specific nonaqueous electrolyte fluid was poured in through the opening of the battery outer case 33 and the battery outer case 33 was sealed by means of the sealing 34, thus completing fabrication.

Such a nonaqueous secondary battery will by its very nature yield the excellent beneficial effects of high battery efficiency and reliability. And since the nonaqueous secondary battery 10B of the seventh embodiment was provided, on those of the positive electrode 11B's exposed-metal portions that face the negative electrode 17B through the interposed separator 23, with a protective layer 16 made from material which has lower electronic conductivity than the metal of the positive electrode collector 12 and which moreover is non-insulative, this embodiment was able to provide a nonaqueous secondary battery that exerts similar effects to those of the nonaqueous secondary battery of the first embodiment and has even more excellent safety.

What is claimed is:

1. A nonaqueous secondary battery comprising:
an active material compound layer placed on at least one face of a collector made of metal foil;
an electrode of one polarity that has a portion with a part where the metal of said collector made of metal foil is exposed; and
an electrode of the opposite polarity, which faces the portion with exposed metal of said electrode of one polarity through an interposed separator;
a protective layer made of material which has electronic conductivity lower than that of said exposed metal of said electrode and which moreover is non-insulative being formed on that part of said portion with exposed metal that faces said electrode of the opposite polarity through said interposed separator;
wherein said non-insulative protective layer consists of an insulative high-molecular substance;
wherein said insulative high-molecular substance is at least one item selected from a group consisting of polyimide, polyamidoimide, and polyvinyl idene fluoride;
wherein said electrode of the opposite polarity has an active material compound layer whose primary constituent is carbon.

2. The nonaqueous secondary battery according to claim 1, wherein said electrode of one polarity is a positive electrode and said collector made of metal foil is composed of aluminum or an alloy with aluminum as primary constituent.

3. The nonaqueous secondary battery according to claim 1, wherein said active material compound layer contains metal oxide.

4. The nonaqueous secondary battery according to claim 1, wherein said active material compound layer whose primary constituent is carbon is applied to at least one face of the collector made of metal foil.

5. The nonaqueous secondary battery according to claim 4, wherein the collector made of metal foil of said electrode of the opposite polarity is composed of copper or an alloy with copper as primary constituent.

6. The nonaqueous secondary battery according to claim 4, wherein the collector made of metal foil of said electrode of the opposite polarity is composed of nickel or an alloy with nickel as primary constituent.

7. The nonaqueous secondary battery according to claim 4, wherein the collector made of metal foil of said electrode of the opposite polarity is composed of stainless steel.

8. The nonaqueous secondary battery according to claim 1, wherein said electrode of one polarity is a positive electrode and said electrode of the opposite polarity is a negative electrode, a rolled electrode array is formed by rolling said positive electrode and negative electrode with a separator interposed therebetween, and a portion where metal is exposed is formed on at least one of the roll-direction edges of said positive electrode.

9. The nonaqueous secondary battery according to claim 1, wherein said electrode of one polarity is a positive electrode and said electrode of the opposite polarity is a negative electrode, a stacked electrode array is formed by stacking said positive electrode and negative electrode with a separator interposed therebetween, and a portion where metal is exposed is formed at the edges of said positive electrode.

10. The nonaqueous secondary battery according to any of claims 1 to 3 or 4 to 9, wherein said non-insulative protective layer consists of said insulative high-molecular substance and powder of at least one item selected from a group consisting of electronically conductive carbon, semiconductor material, and electrically conductive oxide, which has been dispersed in said insulative high-molecular substance.

11. The nonaqueous secondary battery according to any of claims 1 to 3 or 4 to 9, wherein said non-insulative protective layer consists of said insulative high-molecular substance and at least one material selected from a group consisting of electronically conductive carbon, semiconductor material, and electrically conductive oxide, together with a filler material, which have been dispersed in said insulative high-molecular substance.

12. The nonaqueous secondary battery according to claim 11, wherein said filler material is at least one item selected from a group consisting of polyimide powder and alumina powder.

13. The nonaqueous secondary battery according to claim 11, wherein said electronically conductive carbon is a powder for the protective layer and has specific surface area of no more than 40 $m^2/g$.

* * * * *